3,314,137
Patented Apr. 18, 1967

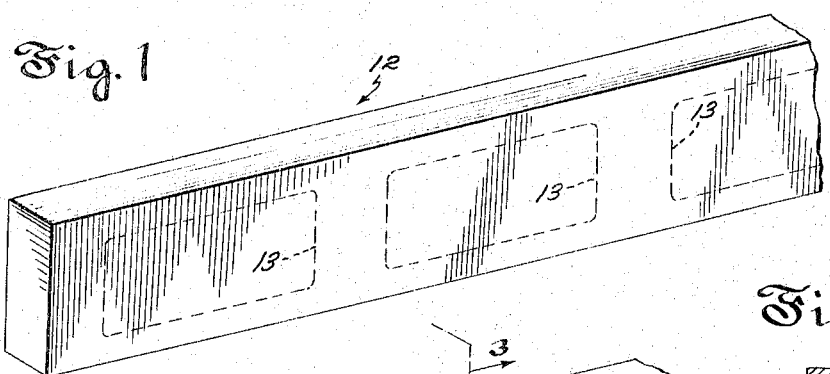
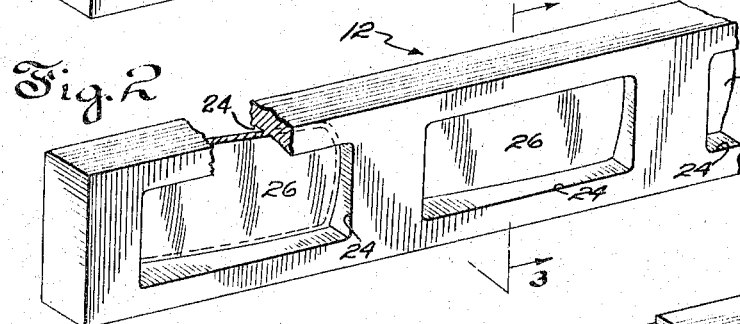
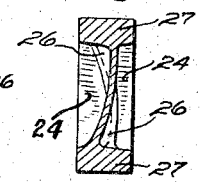
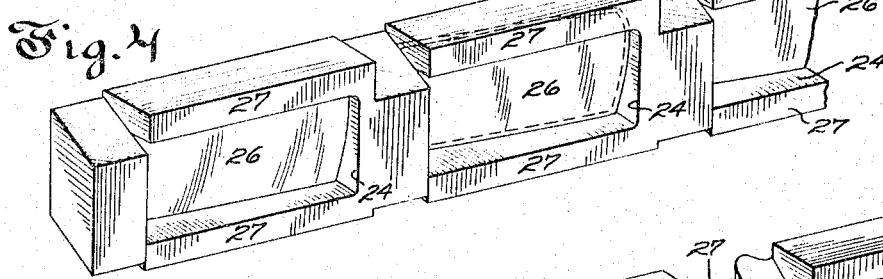
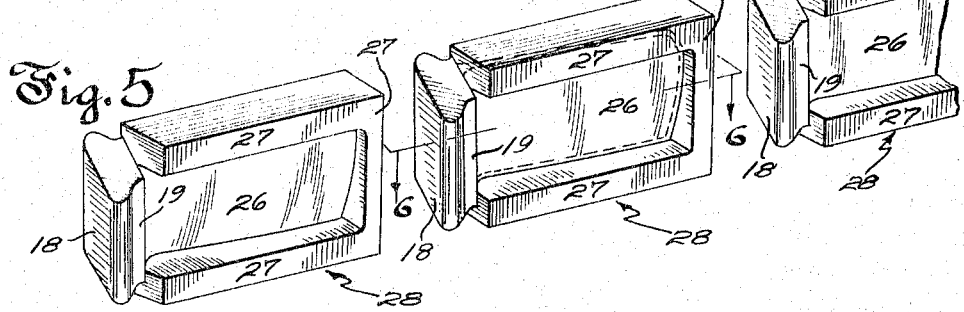
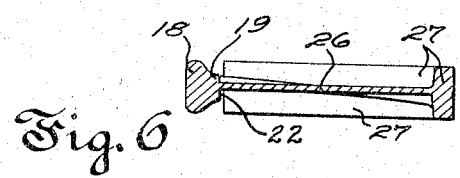

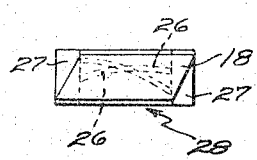
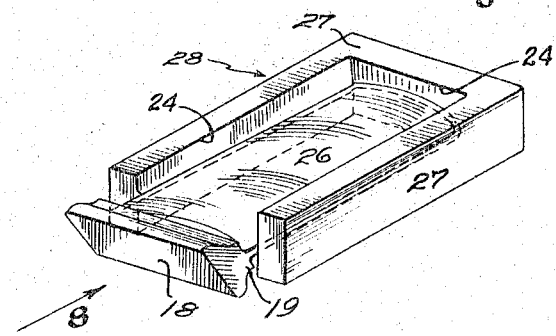
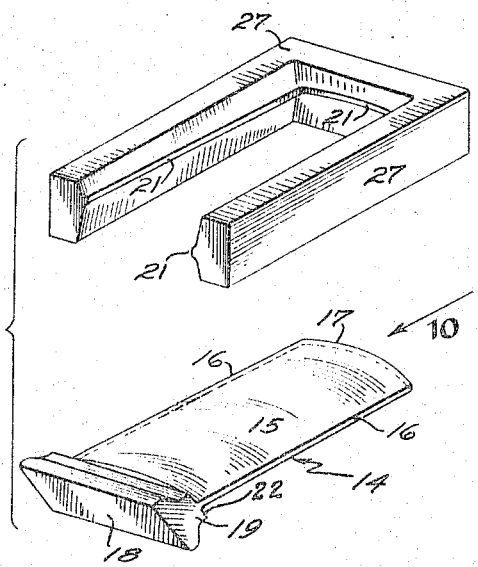
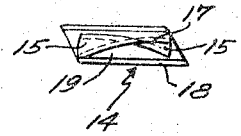
INVENTOR.
E. Peter Schellens
BY
ATTORNEY.

3,314,137
MAKING PRODUCT ARTICLES BY COMBINED CAVITATION AND MACHINING OF BAR STOCK
Eugene Peter Schellens, Essex, Conn., assignor to Schellens True Corporation, subsidiary of Perfect Circle Corporation, Essex, Conn., a corporation of Indiana
Filed Feb. 6, 1964, Ser. No. 342,996
11 Claims. (Cl. 29—413)

This invention relates to the art of producing turbine and compressor blades or comparable products from bar stock. To exemplify such product a compressor blade is illustrated and described herein. The process, however, is applicable to the production of any article produced from a bar by a succession of cavity-sinking and machining operations.

In the following description the term "blade" is used to denote any so called turbine or compressor bucket, blade or vane. The term "airfoil" is used to denote that portion of the blade which stands clear of the wheel by which it is carried for use. The term "root" is used to denote the base or mounting portion of the blade, and the term "platform" is used to denote the transitional surface between the airfoil and the root.

An object of the improved method is to permit the performing of a series of operations sequentially and, if desired, automatically on a number of blades while they remain incorporated as part of the material of the body of the original bar so that the latter can act both as a magazine and a chucking surface throughout the practice of the improved method. This makes possible automation and control of processing to a degree not heretofore possible.

Another object is to provide a rigid, U-shaped border frame surrounding and integral with a previously formed and relatively delicate airfoil portion of the compressor blade, by means of which frame portion of the bar the partially formed blade blank may be rigidly supported for the purpose of machining the root and possibly parts of the platform of the blade. This eliminates the former necessity of embedding the delicate airfoil in a matrix box to give it strength and support during subsequent machining operations on the root portion of the blade.

Another object is to avoid repeated handling and processing of separate work blanks of source material which heretofore has involved chucking, rechucking and transferring individual work blanks separately from one production operation to another.

Another object is to avoid preparatory operations such as forging, swaging or investment casting of separate work blanks in the course of producing turbine blades and analogous work articles.

The foregoing and other objects of the invention will appear in greater particular from the following description of steps by which the improved method may successfully be practiced, which description has reference to the appended drawings wherein:

FIG. 1 represents a bar of blade material with spaced areas indicated by broken lines, in which areas according to this invention airfoil sections of a turbine blade are to be formed by electrochemical metal removal, electrical discharge machining or other appropriate cavity sinking processes as a first step in the improved method.

FIG. 2 shows the bar when the sunken and evenly spaced cavities have resulted in the formation of an airfoil shape of web composed of a residue of the original bar material and surround by the latter.

FIG. 3 is a view taken in section on the plane 3—3 in FIG. 2 showing a section of the residual web or airfoil that is left after the cavity sinking operation of FIG. 2.

FIG. 4 shows a typical secondary operation such as milling, broaching, drilling, etc., performed on and crosswise the bar between the airfoil sections while the latter are still incorporated within the body of the bar.

FIG. 5 shows still further shaping or broaching operations performed on or crosswise the bar, by means of which a dovetail profile of the base of the blade is formed. Also in FIG. 5 the bar is shown to have been severed into separate work blanks by crosswise cuts which leave each work blank consisting of a completely formed blade still integral with a rigid, U-shaped border frame of the material of the original bar.

FIG. 6 is a view in section on the plane 6—6 in FIG. 5 looking in the direction of the arrows showing the airfoil ready to be severed from its border frame.

FIG. 7 is a different perspective view of one of the work blanks shown in FIG. 5.

FIG. 8 is an end view looking at FIG. 7 in the direction of arrow 8.

FIG. 9 is an exploded view showing the completed blade detached by striking it out from its U-shaped border frame.

FIG. 10 is an end view looking at the detached blade of FIG. 9 in the direction of arrow 10.

In FIG. 1 the bar 12 is of rectangular or other suitable sectional shape and of such size as completely to enclose the form of the blades that are to be produced therefrom. The bar may be of commercial length of the material from which the blade is to be produced and may be wholly, partly or not heat treated as required by the desired physical properties of the finished blade.

14 designates a compressor blade shown as a completed product in FIG. 9. Quantities of such product are derived from a continuous length of bar 12. Each such product in the case of a compressor blade comprises several distinct portions of contrasting structural nature. 15 constitutes the airfoil portion of the blade and is relatively very thin and usually tapering in thickness toward its side edges 16 as well as being of concavo-convex shape and having a twisted relationship of its tip end 17 to its root end 18. The relatively massy root end 18 of the blade is joined integrally to the airfoil portion 15 by a platform portion 22 and serves to mount the blade removably on the periphery of a turbine or compressor wheel in usual manner by means of its dove-tail configuration as is well understood in the art.

The improved method of producing the product articles 14 from the bar 12 resides in a series of steps whereby there is first sunk from each of the opposite faces of bar 12 mating pairs of cavities or "foot prints" 24 of such shape and depth as to leave a residual web 26 integral with the bar at the borders of the web. An example of cavity sinking by electrochemical metal removal is disclosed in U.S. Patent No. 3,058,895.

For the purpose of a turbine or compressor blade the web 26 will comprise the entire airfoil surface 15 of the blade 14 including the fillet radius blend area or platform 22, all of which can be produced to predetermined dimensions and shape by the single operation of simultaneous sinking the two mating cavities 24. In this manner the cavity sinking process can yield an extremely accurate form and good surface finish of the airfoil 15 and of its platform 22 while both remain integral with and bordered by the original material of the body of bar 12, being joined therewith by a connecting "flash" 21 which may be as thin as .005″ to .015″.

Subsequently the full length of bar 12 incorporating a plurality of the completed airfoils 15 with their respective platforms 22 is fed or indexed by hand or automatically, through machining stations (not shown) where subsequent operations are performed that are illustrated in FIGS. 4 and 5. These machining operations produce the desired profile shape of the root portions 19 of the blades 14 and serves the relatively massy root end 18 from the remaining portion of the bar bordering the airfoil web 26, while the airfoil web 26 still remains incorporated in and integral with the bar 12. In this way the bar 12 during the complete sequence of operations remains rigid and intact to act as a magazine of blade blanks and to provide rigid work supporting clamping surfaces until the last major operation has been performed. Of the two stages of machining operations indicated respectively in FIGS. 4 and 5, that in FIG. 5 has included a cut-off operation which severs the bar 12 crosswise into sectional lengths each comprised of one completed blade blank left integral with its aforesaid U-shaped framework 27, which framework is open toward and spaced from the relatively massy root end 18. Each such sectional length into which the bar is divided is designated in FIGS. 5, 6, 7 and 8 as a work blank 28.

All that now remains to be done to the work blank 28 is to separate the airfoil web 26 from its reinforcing U-shaped framework 27 by striking it out in a suitable press with the result indicated in FIG. 9. Free edges 16 and a terminal tip 17 are thus imparted to the web 26 and delineate the outline of the airfoil portion 15 of the blade.

The present improvements yield a volume production of compressor and turbine blades or product articles of similar characteristics from wrought material in bar form. They afford a more economical method than precision forging and at the same time yield repeat accuracy and metallurgy superior to that obtainable in investment cast parts. All major operations are performed on the blade 14 while it remains a residual part of the original bar 12 so that in effect the bar serves as a magazine of say a hundred blades handled in unison and automatically through successive machining operations in a way to eliminate virtualy all hand loading and transfer handling of individual work blanks. The improved method is capable of nearly complete automation and is relatively free from the lack of control that has heretofore accompanied hand labor. It is uniquely capable of producing turbine and compressor blades 14 with a high degree of accuracy at an unprecedentedly low cost.

Without limitation to the precise shapes and sequences of operation herein described to explain the principles of the invention, the appended claims are directed to and intended to cover all obvious equivalents thereof that are taught or suggested by the foregoing disclosure.

What is claimed is:

1. The method of making product articles by combined cavitation and machining of bar stock which includes the steps of, sinking a first pair of mating cavities in an elongate bar of source material respectively from opposite lateral faces of said bar sufficiently deep to leave between said cavities a relatively thin residual web of said material integral with bordering portions of the bar, sinking an additional pair of mating cavities respectively from said opposite faces of said bar in a location displaced along the bar from said first pair of cavities, grooving said bar crosswise thereof between said pairs of mating cavities in a manner to produce from said adjoining portions of the bar a desired profile shape of the product article while the same remains integral with said relatively thin residual web, severing the bar crosswise between said pairs of cavities in a manner to divide the bar into separate work blanks each comprising one of said residual webs bordered and reinforced by adjoining portions of the bar, and detaching said webs from said work blanks to liberate therefrom the complete product article.

2. The method of converting a thickish elongate bar of work material into a plurality of product articles having portions thinner than said bar which includes the steps of, thinning said bar in limited areas spaced serially therealong in a manner to leave respectively in said areas residual neighboring webs of said material bordered and joined edgewise by a continuous rigid framework comprised of portions of the original thickness of said bar, machining said bar crosswise thereof between said webs and adjacent at least one of said webs in a manner to generate a relatively massy portion of the product article attached integrally to said one of said webs, severing said bar crosswise into sectional lengths each comprises of at least one of said webs integral with its said massy portion together with a bordering portion of the original thickness of said bar, and striking the margins of said webs from said framework in a manner to delineate free edges of said product articles and separate the latter from said framework.

3. The method defined in claim 2, in which the said bar is severed crosswise in sectional lengths leaving the said framework in the form of a U-shaped body open at its end adjacent the said relatively massy portion of the product article.

4. The method defined in claim 2, in which the said bar is severed crosswise in sectional lengths in a manner to leave the said framework in the form of a U-shaped body opening toward and spaced from the said relatively massy portions of the product article, whereby the said step of striking the margins of said web from said framework also frees said massy portion from said U-shaped body.

5. The method of converting a thickish elongate bar of work material into a plurality of product articles having portions thinner than said bar which includes the steps of, thinning said bar in limited areas spaced serially therealong in a manner to leave respectively in said areas residual neighboring webs of said material bordered and joined edgewise by a continuous rigid framework comprised of portions of the original thickness of said bar, grasping and advancing said bar lengthwise a distance equal to the spacing of said areas, machining said bar crosswise thereof between said webs and adjacent at least one of said webs in a manner to generate repetitively before and after said advancing of the bar a relatively massy portion of the product article attached integrally to said one of said webs, severing said bar crosswise into sectional lengths each comprised of at least one of said webs integral with its said massy portion together with a bordering portion of the original thickness of said bar, and striking the margins of said webs from said framework in a manner to delineate free edges of said product articles and separate the latter from said framework.

6. The method of producing from a thickish bar of work material a product article at least a portion of which is thinner than said bar which includes the steps of, thinning said bar of work material in an area narrower than the width of and shorter than the length of said bar and to a sufficient extent to leave a relatively thin residual web of said material in said area bordered edgewise by a relatively thick framework of said work material of the bar, machining a portion of said framework so as to at least sever said portion from the remainder of framework while leaving said severed portion integral with said web, and detaching the margins of said web from the remainder of said framework in a manner to delineate free edges of the product article comprised of the detached web and said portion of said framework and separate the product article from said bar.

7. The method defined in claim 6, in which said bar is thinned in said areas in a manner to impart to the said residual web a curvilinear surface confined to and bordered by the overall thickness of said bar.

8. The method of converting elongated thickish bar of work material into a plurality of product articles respectively having portions thinner than said bar which includes the steps of, sufficiently thinning said bar in limited areas spaced therealong in a manner to leave respectively in said areas relatively thin residual webs of said material bordered and joined edgewise along said bar by continuous rigid framework comprised of portions of the original thickness of said bar, machining said bar so as to at least sever said bar between said areas and detach portions of said framework from the remainder of said framework in a manner such that each said severed portion remains integral with a web bordered thereby, and detaching the margins of said webs from the remainder of said framework in a manner to delineate free edges of said product articles each comprising a web and an integral severed portion and separate the product article from said bar.

9. The method of producing from a bar of work material a blade type product article having integral airfoil and root portions and at least the airfoil portion of which is thinner than said bar which includes the steps of, thinning said bar of work material in an area substantially narrower than the width of and shorter than the length of said bar and to a sufficient extent to leave a relatively thin airfoil shaped web of said material in said area bordered edgewise by a relatively thick framework of said work material of the bar, clamping on a first portion of said framework, machining a second portion of said framework so as to form the root portion of the product article therefrom and to detach said second portion from the remainder of said framework while leaving said second portion integral with said web and detaching the margins of said web from said framework in a manner to delineate free edges of the airfoil portion of the product article thereby separating the product article from the remainder of said framework.

10. The method of producing from a thickish bar of work material a blade type product article comprised of an airfoil portion having opposed side edges, an end and a root end and with a root portion integral with the root end of the airfoil portion which includes the steps of, thinning said bar of work material so as to leave a relatively thin airfoil shaped residual web of said material bordered on at least one of its side edges and on at least its root end by a relatively thick framework of said work material of said bar, clamping on the portion of said framework bordering the side edge of the web, machining the portion of said framework bordering the root end of the web so as to form therefrom the root portion of the product article integral with said web and severed from the remaining portion of said framework, and detaching the web from said remaining portion of said framework in a manner to delineate free edges of the airfoil portion of the product article.

11. The method of producing from a thickish bar of work material a blade type product article comprised of an airfoil portion having opposed side edges and a root portion integral with one of the ends of the airfoil portion which includes the steps of, thinning said bar of work material so as to leave a relatively thin airfoil shaped residual web of said material bordered on its side edges and on at least one of its ends by a relatively thick framework of said work material of said bar, clamping on portions of said framework bordering the side edges, machining the end portion of said framework forming therefrom the root portion of the product article integral with said web and severed from the remaining portion of said framework, and detaching the web from said remaining portion of said framework in a manner to delineate free edges of the airfoil portion of the product article.

References Cited by the Examiner
UNITED STATES PATENTS

| | | | |
|---|---|---|---|
| 2,113,073 | 4/1938 | Bate | 29—413 |
| 2,377,857 | 6/1945 | Belanger | 29—413 |
| 2,421,323 | 5/1947 | Fruengel | 29—413 |
| 2,972,181 | 2/1961 | Hollis et al. | 29—156.8 |

JOHN F. CAMPBELL, *Primary Examiner.*

THOMAS H. EAGER, *Examiner.*